(12) United States Patent
Takenoshita et al.

(10) Patent No.: US 7,562,839 B2
(45) Date of Patent: Jul. 21, 2009

(54) RECORDING TAPE CARTRIDGE

(75) Inventors: Kenji Takenoshita, Odawara (JP); Kiyoo Morita, Odawara (JP); Kazuo Hiraguchi, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/957,597

(22) Filed: Dec. 17, 2007

(65) Prior Publication Data
US 2008/0179437 A1 Jul. 31, 2008

(30) Foreign Application Priority Data
Jan. 30, 2007 (JP) ............... 2007-020027

(51) Int. Cl.
*G03B 1/58* (2006.01)
(52) U.S. Cl. .................. 242/332.4; 242/348
(58) Field of Classification Search ............ 242/348, 242/348.2, 332.4, 532.6; 360/132
See application file for complete search history.

(56) References Cited

U.S. PATENT DOCUMENTS

| 6,499,684 | B2 * | 12/2002 | Eaton et al. | 242/332.4 |
| 6,659,380 | B2 * | 12/2003 | Shiga et al. | 242/348.2 |
| 7,063,287 | B2 * | 6/2006 | Shiga et al. | 242/348.2 |
| 7,243,871 | B2 * | 7/2007 | Moses et al. | 242/348.2 |
| 2002/0109027 | A1 * | 8/2002 | Ishihara et al. | 242/348 |
| 2004/0031871 | A1 * | 2/2004 | Satoh et al. | 242/348.2 |
| 2004/0041051 | A1 * | 3/2004 | Ishihara | 242/348.2 |
| 2006/0071109 | A1 * | 4/2006 | Moses et al. | 242/348.2 |

FOREIGN PATENT DOCUMENTS

| JP | 09-091915 | | 4/1997 |
| JP | 11-339433 | A | 12/1999 |
| JP | 2001-148179 | A | 5/2001 |
| JP | 2003-030954 | A | 1/2003 |
| JP | 2003-036642 | A | 2/2003 |
| JP | 2004-253078 | A | 9/2004 |
| JP | 2005-135450 | A | 5/2005 |

\* cited by examiner

*Primary Examiner*—William A Rivera
(74) *Attorney, Agent, or Firm*—Sughrue Mion, PLLC

(57) ABSTRACT

A recording tape cartridge includes a leader member that is attached to an end portion of recording tape and on both ends of which flange portions are formed, and holding portions that are formed in an upper case and a lower case and hold the leader member in the vicinity of an opening. Projecting portions are formed on the holding portions and overlap the flange portions on inner surface sides of the flange portions. Through holes are formed in the upper case and the lower case, whereby undercut portions are not present in the projecting portions. The case of the recording tape cartridge can be molded without complicating the configuration of the mold.

14 Claims, 15 Drawing Sheets

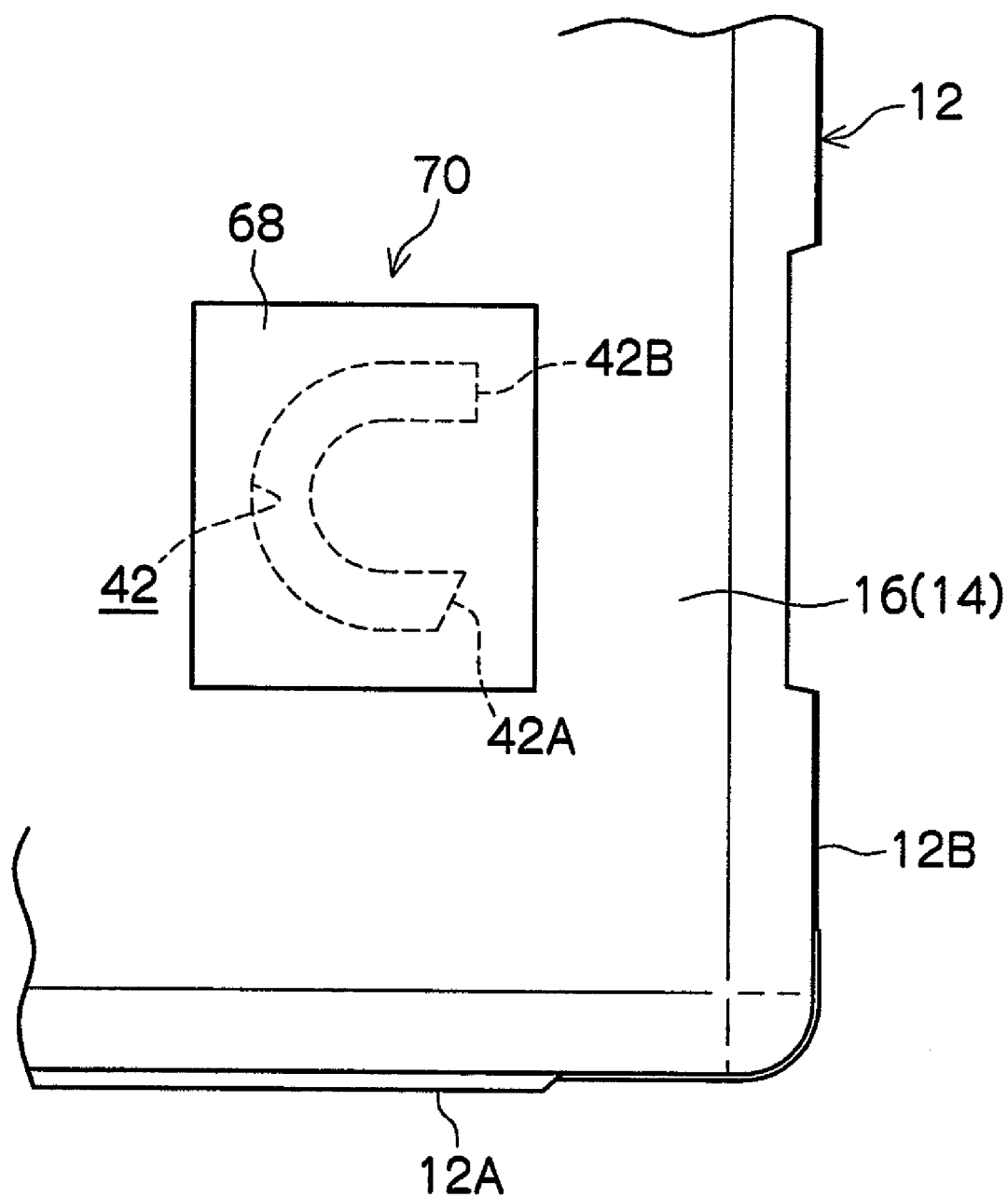

RECORDING TAPE CARTRIDGE

CROSS-REFERENCE TO RELATED APPLICATION

This application claims priority under 35 USC 119 from Japanese Patent Application No. 2007-020027, the disclosure of which is incorporated by reference herein.

BACKGROUND OF THE INVENTION

1. Field of the Invention

The present invention relates to a recording tape cartridge that singly houses, inside a case, a reel onto which is wound recording tape such as magnetic tape used as a recording and playback medium mainly for computers and the like.

2. Description of the Related Art

Conventionally, recording tape cartridges have been known where recording tape such as magnetic tape used as a data recording and playback medium for computers and the like is wound onto a reel and the reel is singly housed inside a case configured by an upper case and a lower case. A leader member that a pullout member of a drive device pulls out is fixedly attached to the distal end of the recording tape. As an example of the leader member, there is a substantially dumbbell-shaped leader pin disposed with flange portions on both end of a body portion to which the recording tape is fixedly attached directly or via leader tape.

The leader pin is held, such that its axial direction is in the height direction of the case, as a result of the flange portions being housed in concave holding portions formed in the upper case and the lower case in the vicinity of an opening and the flange portions being held by a spring or the like. Consequently, when shock is imparted to the vicinity of the opening as a result of the recording tape cartridge being dropped or the like and the upper case and the lower case flexurally deform (split) so as to move apart from each other, there has been the potential for the flange portion to come out of the holding portions and for the leader pin to slant and fall out of the holding portions.

When such a phenomenon occurs, a problem arises in that the pullout member of the drive device becomes unable to check the leader pin, which leads to a system error. For that reason, a recording tape cartridge has conventionally been proposed where undercut grooves in which the flange portions of the leader pin lock—that is, concave grooves that the flange portions enter—are formed in the holding portions so that the flange portions of the leader pin are prevented from coming out of the holding portions (e.g., see Japanese Patent Application Publication No. 2001-148179).

However, such undercut grooves have the problem that it is necessary for them to be molded by disposing a slide mechanism in the mold, so the configuration of the mold becomes complicated and the mold becomes expensive. Further, there is also the problem that, because the shape in the vicinity of the holding portions is complex, it becomes difficult to stabilize the shape and it becomes easier for trouble to occur when the undercut grooves are molded by disposing a slide mechanism in the mold.

SUMMARY OF THE INVENTION

Thus, in view of these circumstances it is an object of the present invention to obtain a recording tape cartridge that enables a case configured such that a leader member does not fall out of holding portions when the recording tape cartridge is not in use to be molded without the configuration of the mold becoming complicated.

A recording tape cartridge of a first aspect of the present invention for achieving this object includes: a case that is configured by an upper case and a lower case and which singly houses a reel onto which recording tape is wound; a leader member that is attached to an end portion of the recording tape directly or via leader tape and on both ends of which flange portions are formed; an opening that is formed in the case and is for allowing the leader member to be pulled out; holding portions that are formed in the upper case and the lower case and hold the flange portions of the leader member in the vicinity of the opening; a projecting portion that is formed on at least one of the holding portions and which overlaps the flange portions on inner surface sides of the flange portions when the leader member is held in the holding portions; and a through hole that is formed in the holding portion on which the projecting portion is formed and from which part of the flange portions is exposed when the leader member is held in the holding portions.

Additionally, in the recording tape cartridge of the first aspect of the present invention, the through hole is formed so that the projecting portion is not made into an undercut portion.

According to the recording tape cartridge of the first aspect of the present invention, even when shock is imparted to the vicinity of the opening as a result of the recording tape cartridge being dropped or the like and the upper case and the lower case flexurally deform (split) so as to move apart from each other, there is no potential for the leader member to slant and fall out of the holding portions because the flange portions of the leader member are held by the projecting portion. Further, because the projecting portion is molded such that it does not become an undercut portion, the configuration of the mold does not become complicated and the mold does not become expensive.

Further, in the recording tape cartridge of the first aspect of the present invention, a clearance between peripheral surfaces of the flange portions held in the holding portions and wall surfaces that are formed around the through holes and which the peripheral surfaces face is less than 0.5 mm.

In the recording tape cartridge of this configuration, the ingress of dust and the like from the through hole can be controlled.

Further, in the recording tape cartridge of the first aspect of the present invention, the through hole may be blocked by a blocking member.

In the recording tape cartridge of this configuration, the ingress of dust and the like from the through hole can be prevented.

As described above, according to the present invention, there can be provided a recording tape cartridge that can mold, without the configuration of the mold becoming complicated, a case configured such that the leader member does not fall out of the holding portions when the recording tape cartridge is not in use.

BRIEF DESCRIPTION OF THE DRAWINGS

FIG. 7 is a general bottom view showing a seal member serving as a blocking member that blocks the through hole;

DETAILED DESCRIPTION OF THE INVENTION

Figure 1:
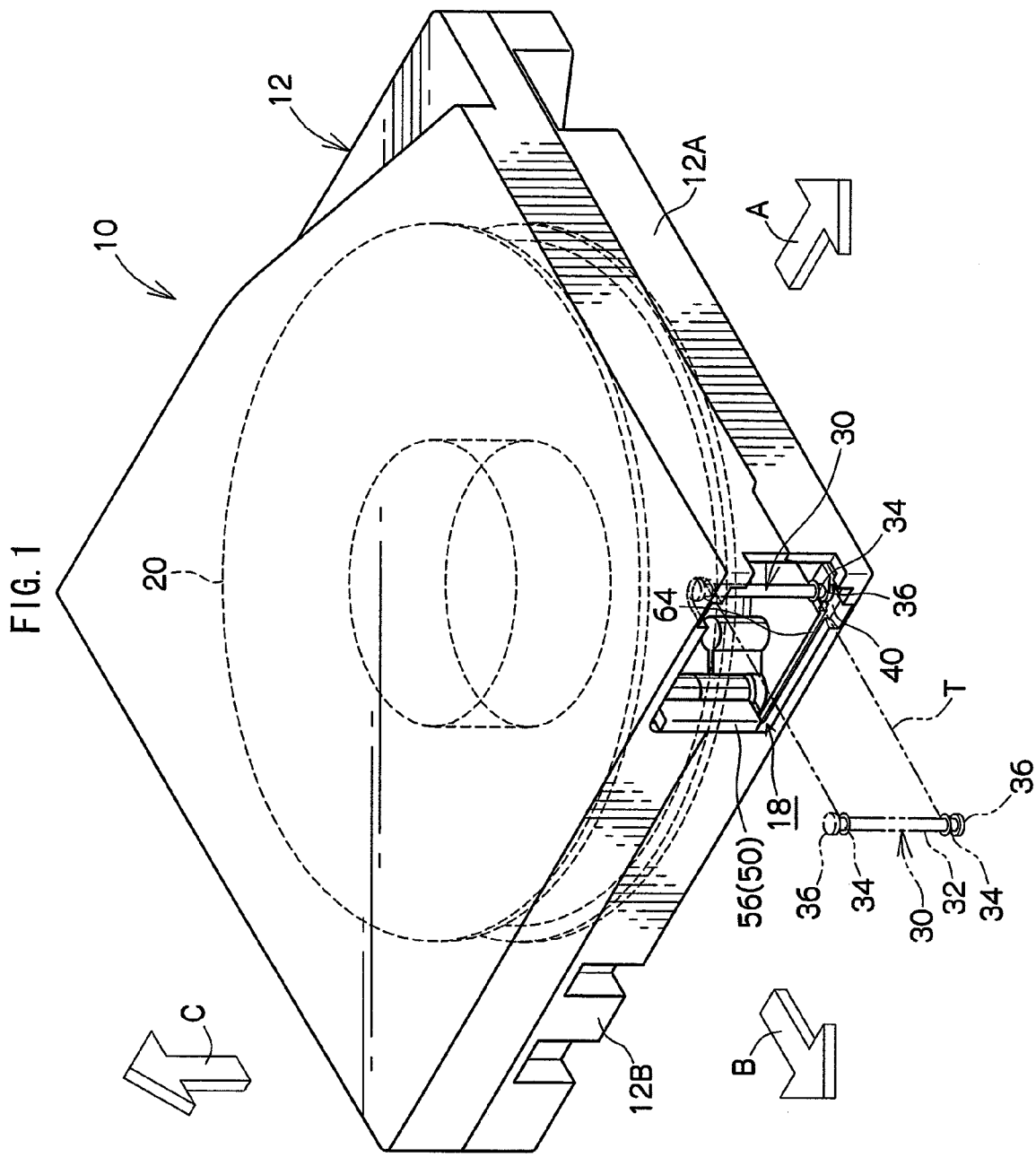
FIG. 1 is a general perspective view of a recording tape cartridge.

Below, the best mode for implementing the present invention will be described in detail on the basis of an embodiment shown in the drawings. For the convenience of description, in FIG. 1, arrow A will represent the direction in which a recording tape cartridge 10 is loaded into a drive device and be referred to as a front direction (front side) of the recording tape cartridge 10. Additionally, the direction of arrow B, which is orthogonal to arrow A, will be referred to as a right direction (right side), and the direction of arrow C will be referred to as an upper direction (upper side).

Figure 2:
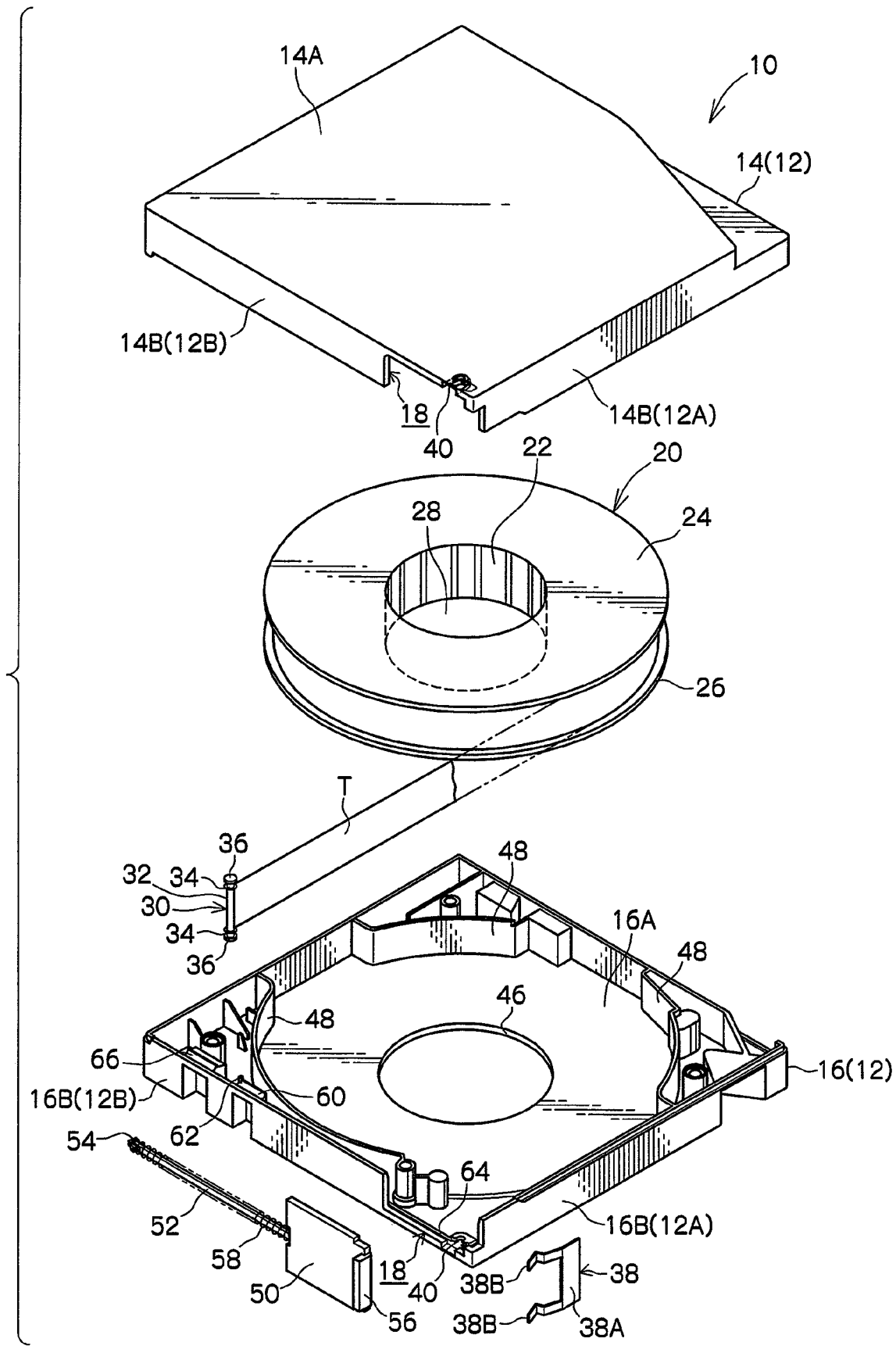
FIG. 2 is a general exploded perspective view of the recording tape cartridge.

As shown in FIG. 1 and FIG. 2, the recording tape cartridge 10 includes a case 12 that has a substantially rectangular box-like shape. The case 12 includes an upper case 14 and a lower case 16 made of a synthetic resin such as polycarbonate (PC). The upper case 14 is configured by a top plate 14A and a peripheral wall 14B that is disposed upright along the peripheral edge of the top plate 14A. The lower case 16 is configured by a bottom plate 16A and a peripheral wall 16B that is disposed upright along the peripheral edge of the bottom plate 16A. The case 12 is configured as a result of the upper case 14 and the lower case 16 being joined together by ultrasonic welding or with screws in a state where the peripheral wall 14B and the peripheral wall 16B have been brought into contact with each other.

Just one reel 20 is rotatably housed inside the case 12. The reel 20 is configured by a bottomed circular cylinder-shaped reel hub 22 that configures the axial center portion of the reel 20, a lower flange 26 that is disposed on and molded integrally with the lower end portion of the reel hub 22, and an upper flange 24 that is ultrasonically welded to the upper end portion of the reel hub 22. Additionally, recording tape T such as magnetic tape serving as an information recording and playback medium is wound around the outer peripheral surface of the reel hub 22, and the width direction end portions of the recording tape T wound around the reel hub 22 are held by the upper flange 24 and the lower flange 26.

A reel gear (not shown) is annularly formed in the undersurface of a bottom wall 28 of the reel hub 22, and a gear opening 46 for exposing the reel gear to the outside is disposed in the center portion of the lower case 16. The reel gear exposed from the gear opening 46 meshes with, and is driven to rotate by, a drive gear (not shown) formed on a rotating shaft (not shown) of the drive device (not shown), whereby the reel 20 is made capable of relative rotation with respect to the case 12 inside the case 12.

Further, an annular reel plate (not shown) comprising a magnetic material is fixedly attached, by insert molding or the like, to the undersurface of the bottom wall 28 on the radial direction inner side of the reel gear. The reel plate is configured to be attracted and held by the magnetic force of an annular magnet (not shown) disposed in the rotating shaft of the drive device. Moreover, the reel 20 is held, such that it does not rattle, by a free play limiting wall 48 that is partially disposed on, so as to project from, the inner surfaces of the upper case 14 and the lower case 16 and which serves as an inner wall on a circular locus coaxial with the gear opening 46.

Further, an opening 18 for allowing the recording tape T wound onto the reel 20 to be pulled out is formed in a right wall 12B of the case 12. A leader pin 30 that is locked (engaged) and pulled out by a pullout member (not shown) of the drive device is fixedly attached, directly or via leader tape (not shown), to the free end portion of the recording tape T pulled out from the opening 18.

Figure 3:
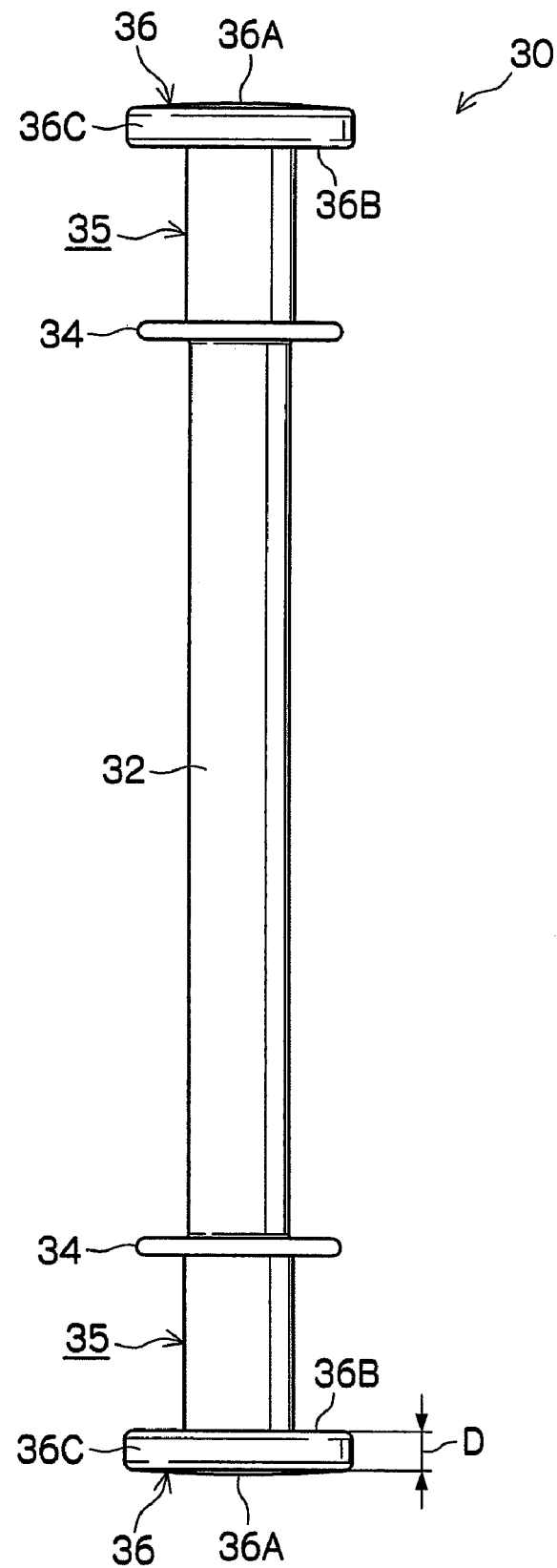
FIG. 3 is a general front view of a leader pin.

As shown in detail in FIG. 3, the leader pin 30 includes a circular column-shaped body portion 32 and disc-shaped flange portions 36 that are formed integrally on both ends of the body portion 32 and have diameters that are larger than the diameter of the body portion 32. Small flange portions 34 that define the area in which the recording tape T is attached are formed integrally on the body portion 32. The diameters of the small flange portions 34 are formed so as to be larger than the diameter of the body portion 32 and either the same as or smaller than the diameters of the flange portions 36.

Additionally, the small flange portions 34 are formed so as to be thinner than the flange portions 36, and the areas between the small flange portions 34 and the flange portions 36 are configured as annular grooves 35 into which hooks (not shown) or the like of the pullout member of the drive device lock. By disposing the small flange portions 34, the hooks or the like do not contact and damage the recording tape T when the pullout member pulls out the recording tape T. It will be noted that outer surfaces 36A of the flange portions 36 are configured as convexly curved surfaces whose curvature is small.

A pair of upper and lower holding portions 40 that position and hold the leader pin 30 inside the case 12 is disposed inside the opening 18 in the case 12—that is, in the inner surface of the top plate 14A of the upper case 14 and in the inner surface of the bottom plate 16A of the lower case 16. The holding portions 40 include concave portions 41 that are substantially U-shaped when seen in plan view, are formed in the inner surface of the top plate 14A and in the inner surface of the bottom plate 16A, and whose sides in the direction in which the recording tape T is pulled out are open. The flange portions 36 of the leader pin 30 in an upright state are configured to be capable of entering and exiting the concave portions 41 from the open sides thereof. It will be noted that the configuration of the holding portions 40 will be described in detail later.

Figure 4:
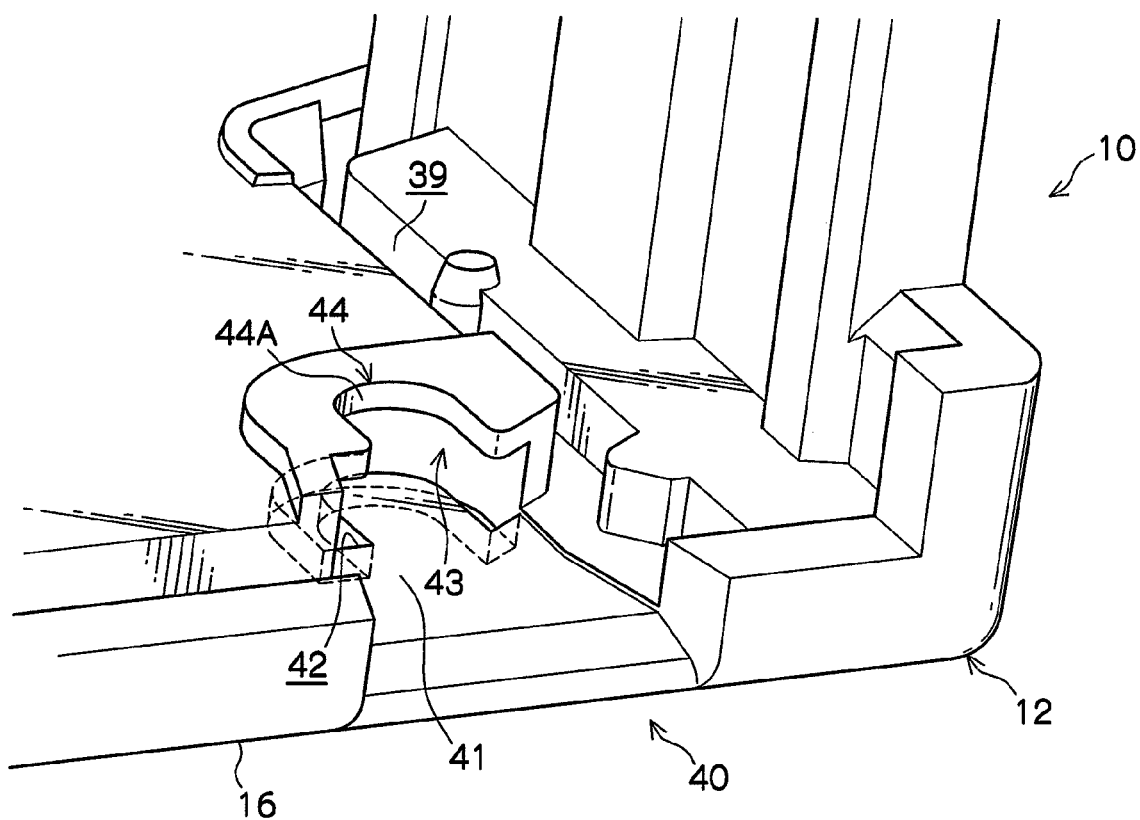
FIG. 4 is a general perspective view showing a holding portion when it is not holding the leader pin.
Figure 5:
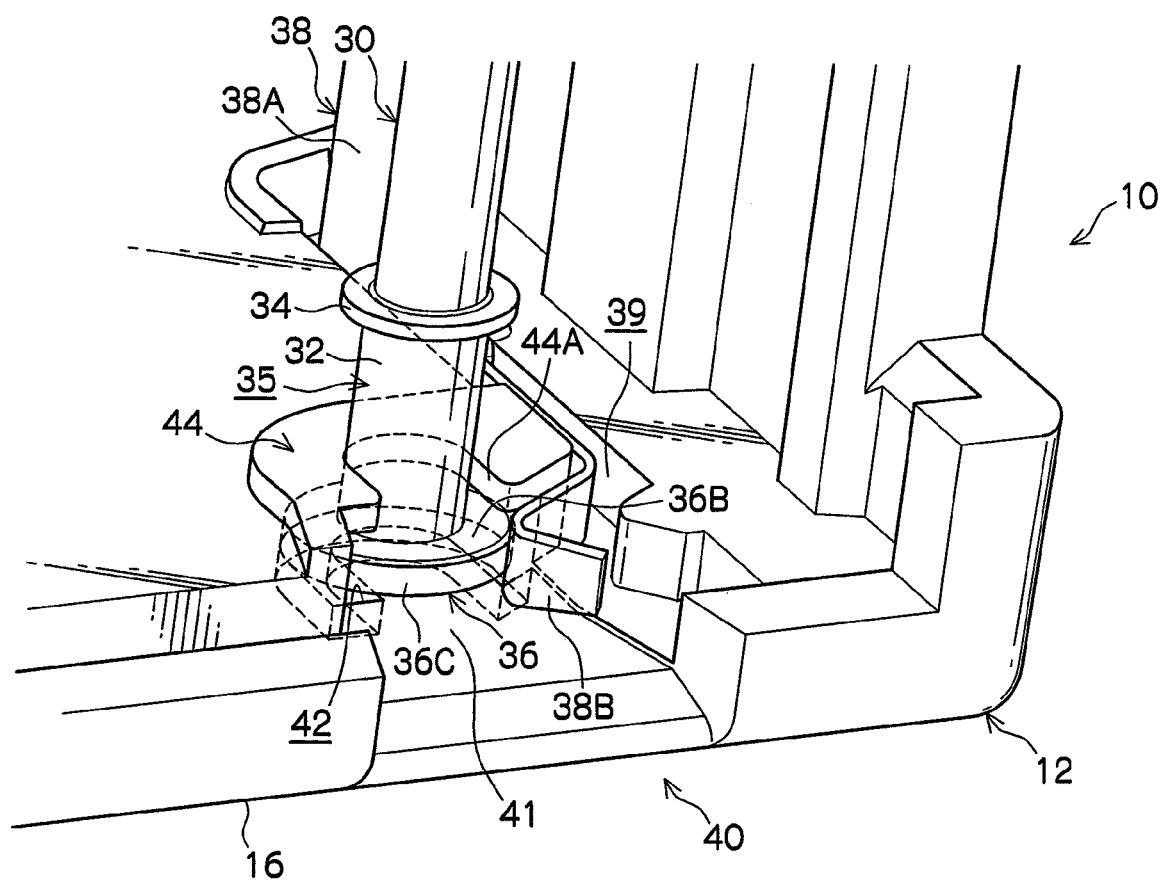
FIG. 5 is a general perspective view showing the holding portion when it is holding the leader pin.

Further, as shown in FIG. 4 and FIG. 5, groove portions 39 that house a plate spring 38 formed in a substantial U shape are formed in the top plate 14A of the upper case 14 and in the bottom plate 16A of the lower case 16 between the holding portions 40 and a front wall 12A. That is, upper and lower end portions of a base portion 38A of the plate spring 38 are configured to be fixedly disposed inside the groove portions 39.

Additionally, two-pronged distal end portions 38B of the plate spring 38 are configured to respectively engage with (push against) outer peripheral surfaces 36C of the upper and lower flange portions 36 of the leader pin 30 and hold the leader pin 30 in the holding portions 40 (the concave portions 41) (see FIG. 5). It will be noted that when the leader pin 30 enters and exits the holding portions 40, the distal end portions 38B of the plate spring 38 appropriately elastically deform to allow movement of the leader pin 30.

Further, the opening 18 is opened and closed by a door 50. As shown in FIG. 1 and FIG. 2, the door 50 is formed in a substantially rectangular plate-like shape of a size capable of blocking the opening 18, and groove portions 64 that allow the upper and lower end portions of the door 50 to slidably fit therein are formed in the top plate 14A and the bottom plate 16A inside the opening 18 so that the door 50 can move along the right wall 12B of the case 12.

Further, a shaft 52 is disposed on, so as to project from, the center of the rear end portion of the door 50, and a coil spring 58 is fitted over the shaft 52. Additionally, an enlarged portion 54 that prevents the coil spring 58 from coming off is formed on the rear end of the shaft 52. Further, a support table 60 including a locking portion 62 that locks the rear end of the coil spring 58 fitted over the shaft 52 is disposed on, so as to project from, the lower case 16.

Consequently, the shaft 52 is slidably supported on the support table 60 and the rear end of the coil spring 58 is locked by the locking portion 62, whereby the door 50 is always biased by the biasing force of the coil spring 58 in the direction in which the door 50 blocks the opening 18. It will be noted that it is preferable to further dispose, on the rear side of the support table 60, a support table 66 that supports the shaft 52 when the opening 18 is open.

Further, a tongue 56 for opening and closing the door 50 is disposed on the front end portion of the door 50 so as to project outward. The tongue 56 is configured to engage with an opening/closing member (not shown) of the drive device in accompaniment with the loading of the recording tape cartridge 10 into the drive device. Thus, the door 50 is opened counter to the biasing force of the coil spring 58.

Next, the configuration of the holding portions 40 will be described in greater detail. It will be noted that, because both the upper and lower holding portions 40 have the same configuration, the holding portion 40 of the lower case 16 shown in FIG. 4 and FIG. 5 will be mainly described. As shown in FIG. 4 and FIG. 5, the holding portions 40 include the concave portions 41 that are substantially U-shaped when seen in plan view and hold the outer surfaces 36A (see FIG. 3) of the flange portions 36. A projecting portion 44 that overlaps, but does not contact, an inner surface 36B side of the flange portion 36 by a predetermined amount (e.g., 30% or more of the area of the inner surface 36B of the flange portion 36) when the leader pin 30 (the flange portion 36) is held in the holding portion 40 (the concave portion 41) is formed in a position a predetermined distance away from the concave portion 41 in the height direction.

That is, a distance W (see FIG. 10A) between the concave portion 41 and the projecting portion 44 is formed so as to be wider than a thickness D (see FIG. 3) of the flange portion 36, so that a predetermined clearance is formed between the inner surface 36B of the flange portion 36 held in the concave portion 41 and an outer surface 44B of the projecting portion 44. Additionally, a cutout portion 44A that is substantially U-shaped when seen in plan view and admits the annular groove 35 portion of the body portion 32 is formed in the substantial center of the projecting portion 44 on the side in the direction in which the recording tape T is pulled out.

Figure 6A:
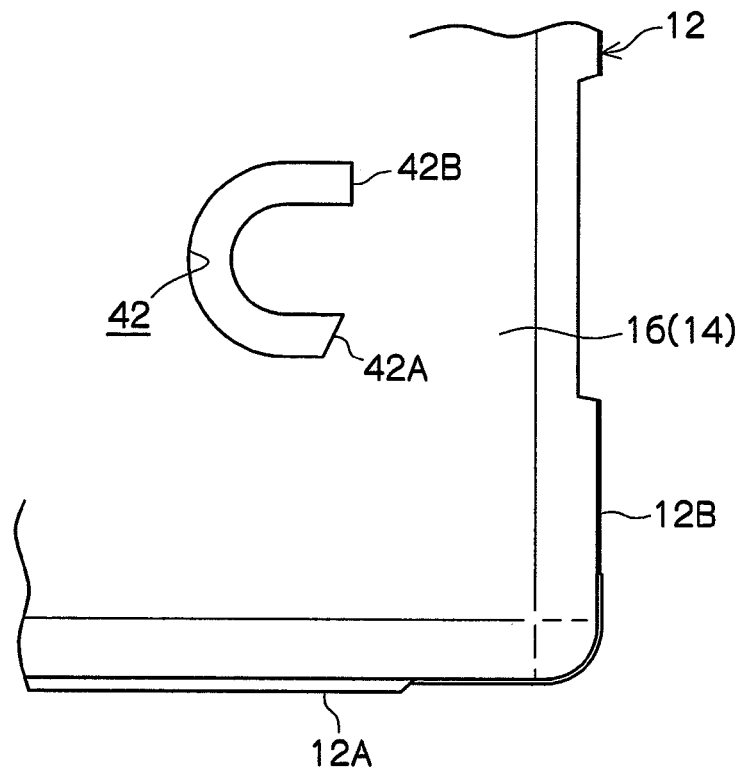
FIG. 6A is a general bottom view showing a through hole when the leader pin is not being held.

Further, although the projecting portions 44 are molded integrally with the upper case 14 and the lower case 16, the projecting portions 44 are molded by a movable core (not shown) that is substantially U-shaped (coinciding with the shape of the projecting portions 44) when seen in plan view or bottom view such that release from an unillustrated mold does not become impossible after molding (such that the projecting portions 44 do not become undercut portions). Consequently, through holes (core holes) 42 that are substantially U-shaped when seen in plan view or in bottom view such as shown in FIG. 6A are formed in the upper case 14 and the lower case 16 by removing the movable core when the upper case 14 and the lower case 16 are released from the mold after being molded.

Further, inner wall surfaces 43 that are substantially U-shaped when seen in plan view and which the outer peripheral surfaces 36C of the flange portions 36 face (contact) are formed around the through holes 42 and around the concave portions 41 in the inner surface of the top plate 14A of the upper case 14 and the inner surface of the bottom plate 16B of the lower case 16. The projecting portions 44 are disposed so as to extend integrally from the height direction distal end portions of the inner wall surfaces 43 towards the sides in the direction in which the recording tape T is pulled out.

It will be noted that the end portions on the front wall 12A side and the opening 18 side of the through holes 42, the inner wall surfaces 43 and the projecting portions 44 are formed in shapes that are diagonally cut out so as to admit the two-pronged distal end portions 38B of the plate spring 38. For that reason, in the through hole 42 shown in FIGS. 6A and 6B, the shape of one end portion 42A and the shape of the other end portion 42B of the through holes 42 are mutually different, but the shapes of the end portions 42A and 42B are not limited to the shapes that are shown; for example, the end portion 42B may also be given a shape that is the same as that of the end portion 42A.

Figure 6B:
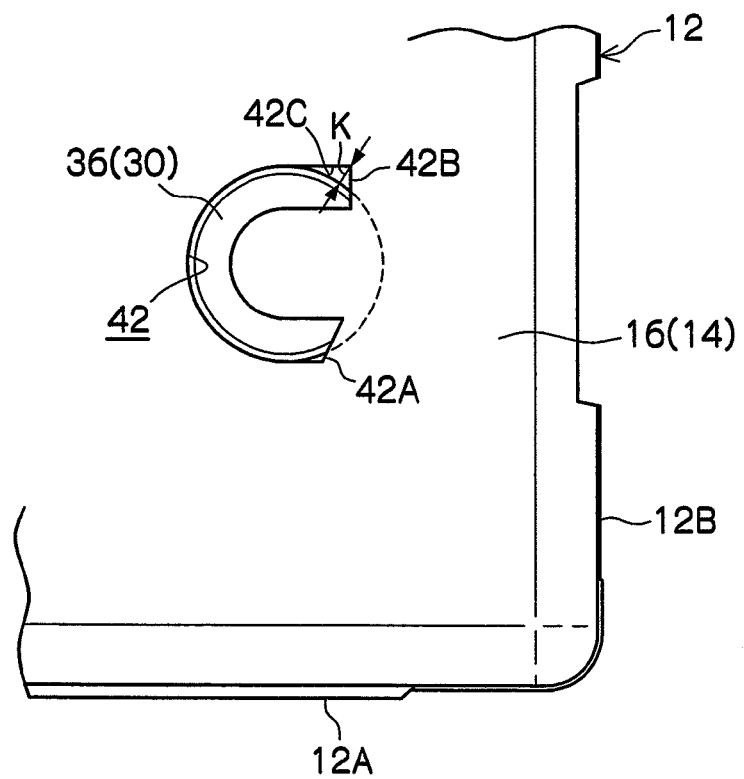
FIG. 6B is a general bottom view showing the through hole when the leader pin is being held.

Further, as shown in FIG. 6B, the through hole 42 is substantially blocked as a result of the leader pin 30 (the flange portion 36) being held in the holding portion 40 (the concave portion 41), but a clearance K between the outer peripheral surface 36C of the flange portion 36 and the inner wall surface 43 at this time is set to be less than 0.5 mm.

That is, because the projecting portion 44 is formed in a substantial U shape when seen in plan view in order to admit the body portion 32 and the through hole 42 is also formed in a substantial U shape when seen in plan view in accompaniment therewith, at the other end portion 42B of the through hole 42, the clearance K between the outer peripheral surface 36C of the flange portion 36 and the inner wall surface 43 is wide, and a non-blocked portion 42C that is difficult to be blocked by the flange portion 36 is formed in the through hole 42, but the maximum clearance K at this non-blocked portion 42C is set to be less than 0.5 mm.

Here, the reason the clearance K is set to be less than 0.5 mm is because the distance between the door 50 and the upper case 14 and the lower case 16 where the clearance is the largest is about 0.5 mm in existing recording tape cartridges. That is, this is so that the same dust resistance as in existing recording tape cartridges can be ensured as long as the maximum clearance K at the non-blocked portion 42C is less than 0.5 mm.

It will be noted that, in order to further raise dust resistance, as shown in FIG. 7, the through holes 42 may also be blocked by a blocking member 70 such as seal members 68. That is, seal members 68 whose area is larger than that of the through holes 42 may be adhered to the outer surface of the top plate 14A of the upper case 14 and to the outer surface of the bottom plate 16A of the lower case 16 to block the through holes 42.

Figure 8:
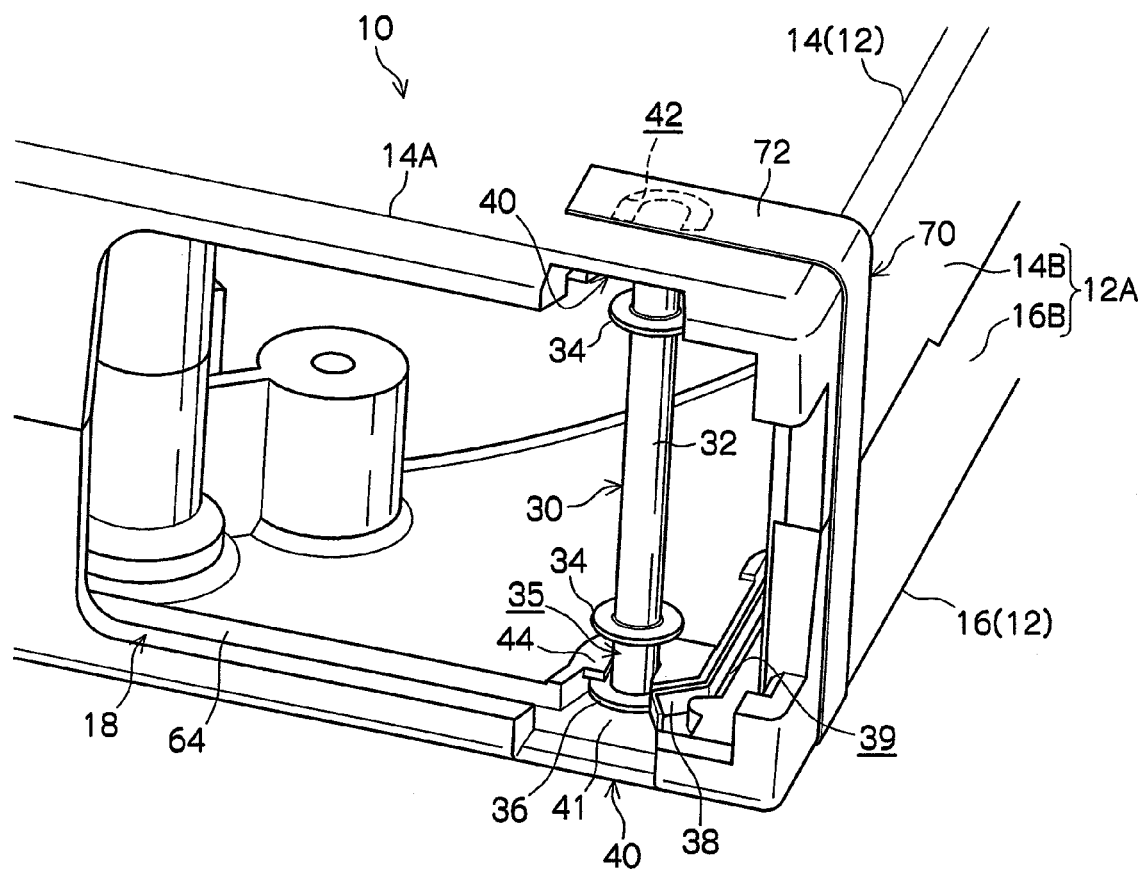
FIG. 8 is a general perspective view showing a seal member serving as a blocking member that blocks the through hole.

Further, as shown in FIG. 8, a long and narrow seal member 72 having a width capable of sufficiently blocking the through holes 42 may be adhered as the blocking member 70 so as to straddle the upper case 14 and the lower case 16. By configuring the blocking member 70 in this manner, dust resistance can be raised, and the splitting phenomenon where the upper case 14 and the lower case 16 move apart from each other when shock is imparted to the vicinity of the opening 18 in the case 12 as a result of the recording tape cartridge 10 being dropped or the like can be controlled.

Figure 9:
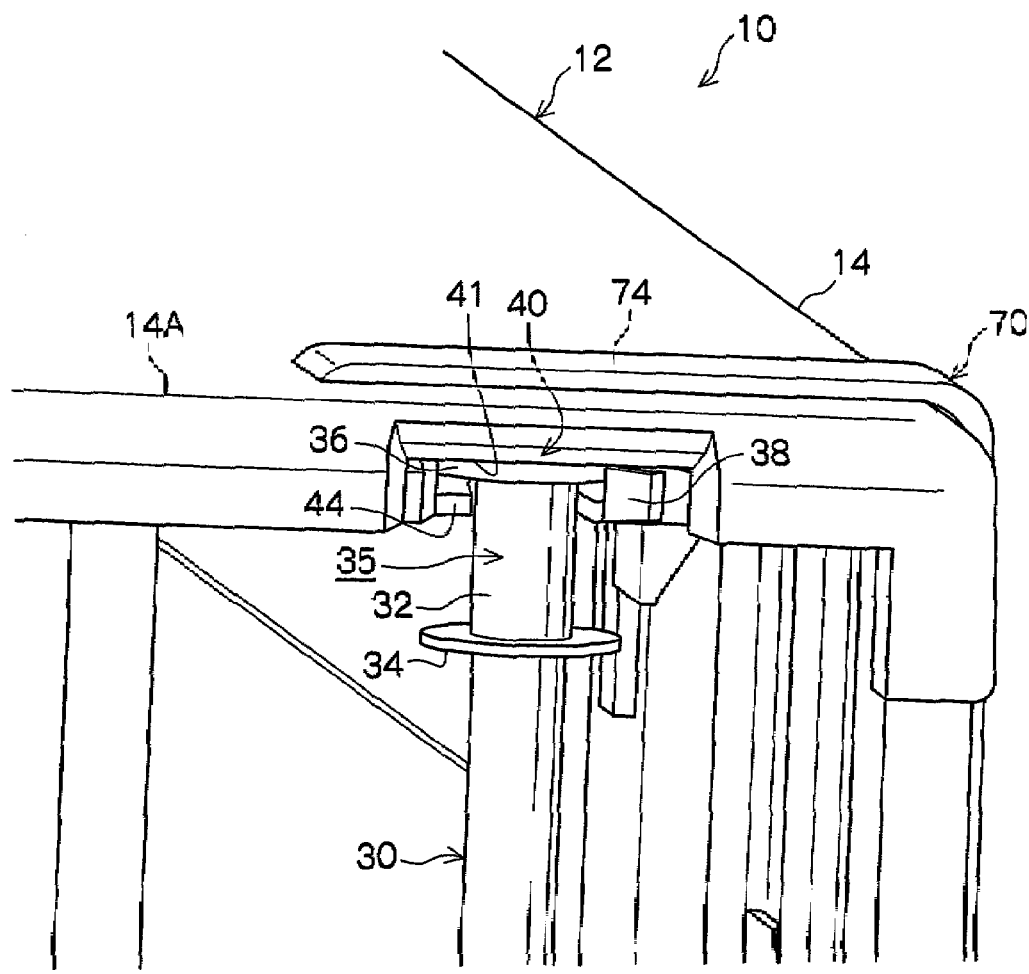
FIG. 9 is a general perspective view showing a clip member serving as a blocking member that blocks the through hole.

Moreover, as shown in FIG. 9, a clip member 74 formed in a substantial U shape and having a width capable of sufficiently blocking the through holes 42 may be fitted as the blocking member so as to straddle the upper case 14 and the lower case 16. That is, locking concave portions (not shown) may be formed in the outer surface of the top plate 14A of the upper case 14 and the outer surface of the bottom plate 16A of the lower case 16, for example, and both distal end portions of the clip member 74 may be fitted together with those locking concave portions.

Because the rigidity of the clip member 74 is higher than that of the seal member 72 shown in FIG. 8, the rigidity of the case 12 in the vicinity of the opening 18 can be raised. That is, by configuring the blocking member 70 in this manner, dust resistance can be raised, and both the splitting phenomenon where the upper case 14 and the lower case 16 move apart from each other when shock is imparted to the vicinity of the opening 18 in the case 12 as a result of the recording tape cartridge 10 being dropped or the like and plastic deformation of the upper case 14 and the lower case 16 can be prevented.

Figure 10A:
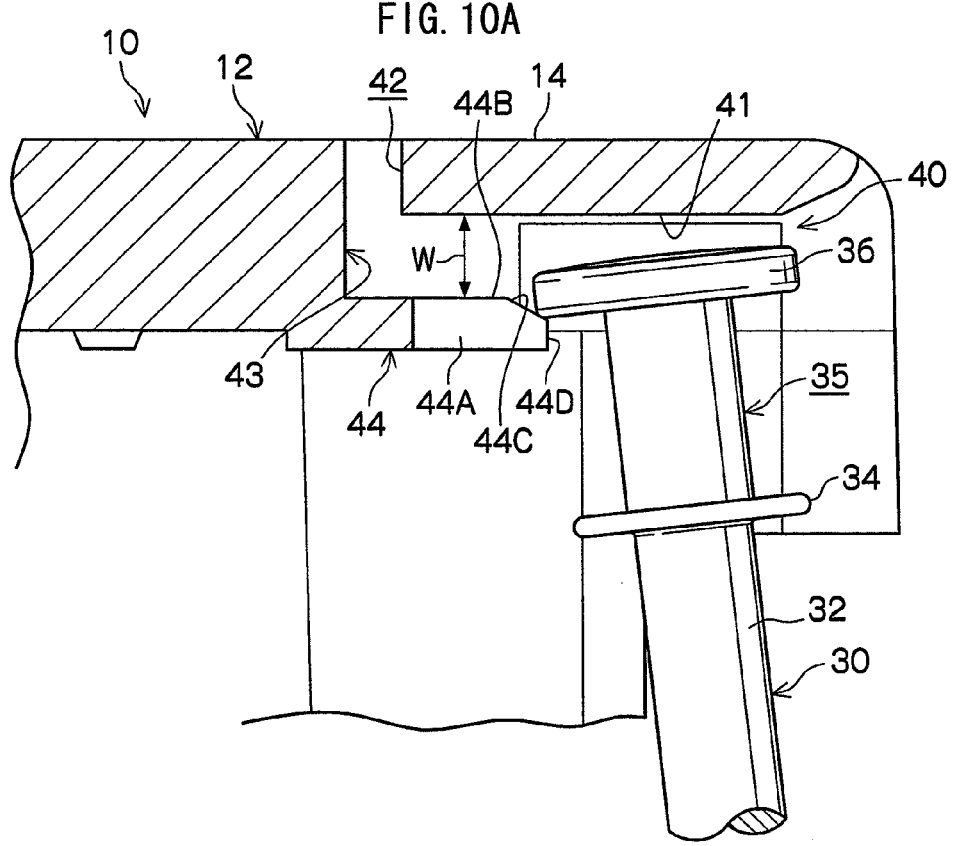
FIG. 10A is a general side sectional view showing a state where the leader pin slants and has been returned to the holding portion.
Figure 10B:
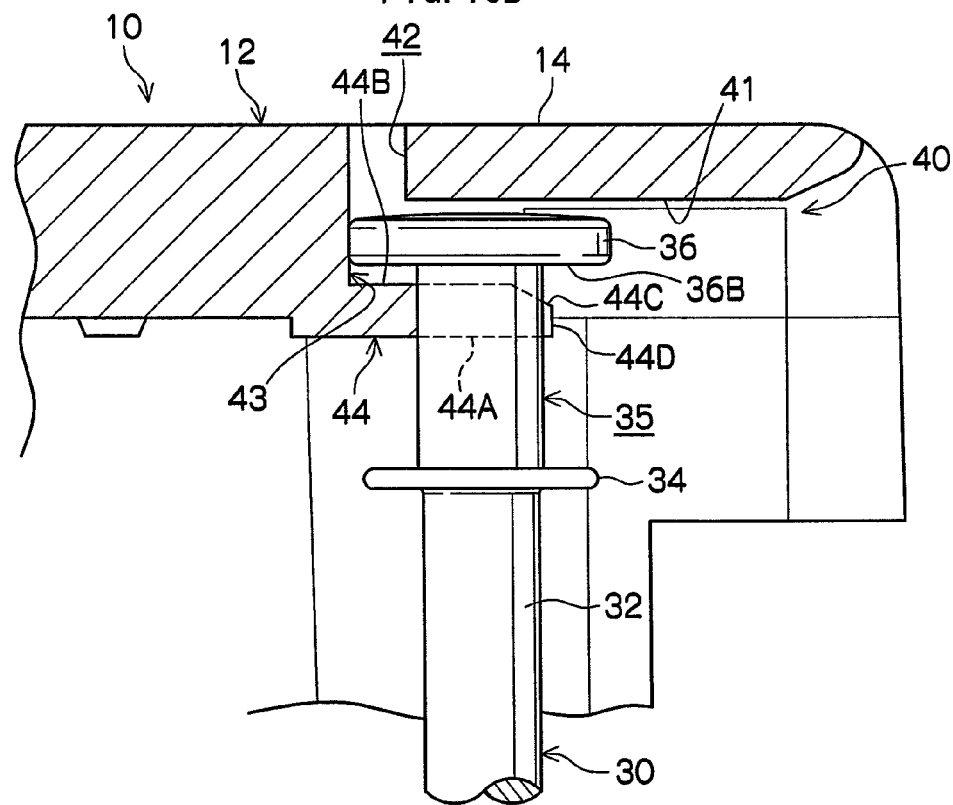
FIG. 10B is a general side sectional view showing a state where the leader pin is held in the holding portion.

Further, as shown in FIGS. 10A and 10B, the peripheral surfaces on the cutout portion 44A sides of the projecting portions 44 and the sides where the flange portions 36 are inserted may be configured as tapered surfaces 44C having a predetermined angle by chamfering or filleting (rounding). Thus, even when the leader pin 30 is returned to the holding portions 40 in a state where the leader pin 30 is slanted (see FIG. 10A), the leader pin 30 is housed without the flange portions 36 interfering with (without stacking) the projecting portions 44.

That is, according to this, the leader pin 30 becomes capable of being stably attached and detached even when it has the projecting portions 44. It will be noted that it is desirable to leave straight line portions 44D on the peripheral surfaces on the cutout portion 44A sides. When such straight line portions 44D are left, the strength of the projecting portions 44 can be ensured (it can be ensured that the strength of the projecting portions 44 is not compromised).

Next, the action of the recording tape cartridge 10 having the configuration described above will be described. When the recording tape cartridge 10 having the above-described configuration is not in use (when the recording tape cartridge 10 is not loaded in the drive device, such as during storage or during transport), the opening 18 is blocked by the door 50. Additionally, the recording tape T is wound onto the reel hub 22 of the reel 20.

When the recording tape T is to be used, the recording tape cartridge 10 is loaded front wall 12A first into the drive device along the direction of arrow A. Then, first the opening/closing member disposed in the drive device engages with the tongue 56 of the door 50. Then, when the recording tape cartridge 10 moves further in the direction of arrow A in this state, the opening/closing member causes the tongue 56 to move relatively rearward counter to the biasing force of the coil spring 58. Then, the door 50 from which the tongue 56 projects slides rearward inside the groove portions 64 along the right wall 12B to open the opening 18.

In this manner, when the recording tape cartridge 10 is loaded a predetermined depth into the drive device and the opening 18 is completely opened, the recording tape cartridge 10 is lowered a predetermined height, and a positioning member (not shown) of the drive device is inserted into a positioning hole portion (not shown) formed in the lower case 16. Thus, the recording tape cartridge 10 is accurately positioned in a predetermined position inside the drive device, and further sliding of the door 50 (movement rearward) is limited.

Further, because of the downward movement of the recording tape cartridge 10, the rotating shaft relatively enters the gear opening 46 to cause the drive gear to mesh with the reel gear. Then, in a state where the drive gear and the reel gear are completely meshed, the reel plate is attracted and held by the magnetic force of the annular magnet disposed inside the drive gear, whereby the reel 20 becomes relatively rotatable with respect to the case 12 inside the case 12 while the meshing of the reel gear with respect to the drive gear is maintained.

Meanwhile, the pullout member disposed in the drive device enters the case 12 through the opened opening 18 and grips and pulls out the leader pin 30 positioned and held in the holding portions 40. At this time, because the recording tape cartridge 10 is accurately positioned inside the drive device, the hooks of the pullout member can be reliably caused to lock into the annular grooves 35 in the leader pin 30.

In this manner, the leader pin 30 that has been pulled out from the opening 18 is housed in an unillustrated take-up reel. Then, the take-up reel and the reel 20 are driven to rotate synchronously, whereby the recording tape T is sequentially pulled out from the case 12 while being taken up on the take-up reel, and the recording and playback of information is performed by a recording and playback head (not shown) disposed along a predetermined tape path.

When the recording and playback of information ends and the recording tape cartridge 10 is to be ejected from the drive device, first, the rotating shaft reversely rotates, whereby the recording tape T is rewound onto the reel 20. Then, when the recording tape T is completely rewound onto the reel 20, the leader pin 30 is held in the holding portions 40. It will be noted that, at this time, the distal end portions 38B of the plate spring 38 appropriately elastically deform to allow the leader pin 30 to be housed in the holding portions 40. Additionally, the projecting portions 44 overlap the flange portions 36 by a predetermined amount when seen in plan view on the inner surface sides of the flange portions 36.

Thereafter, the recording tape cartridge 10 is raised a predetermined height, the positioning member is pulled out from the positioning hole portion, the rotating shaft is pulled out from the gear opening 46, and the drive gear disengages from the reel gear. Then, the recording tape cartridge 10 is moved in the opposite direction of the direction of arrow A by an unillustrated ejecting mechanism. Then, in accompaniment with this movement, the door 50 is slid by the biasing force of the coil spring 58 in the direction in which the door 50 blocks the opening 18 to completely block the opening 18 (the door 50 returns to its initial state). In this manner, the recording tape cartridge 10 whose opening 18 has been blocked is completely ejected from the inside of the drive device.

Here, the action of the holding portions 40 will be described further. As shown in FIG. 5, FIG. 8 and FIG. 10B, the leader pin 30 is held in the holding portions 40 in a state where the flange portions 36 disposed on both the upper and lower end portions of the body portion 32 have entered the area between the inner surface of the top plate 14A of the upper case 14 and the projecting portion 44 and the area between the inner surface of the bottom plate 16A of the lower case 16 and the projecting portion 44. Consequently, even when shock resulting from the recording tape cartridge 10 being dropped or the like is imparted to the vicinity of the opening 18 and the vicinity of the opening 18 tries to flexurally deform so as to split (such that the upper case 14 and the lower case 16 move apart from each other), that flexural deformation can be controlled by the leader pin 30.

That is, when the vicinity of the opening 18 flexurally deforms so as to split, that splitting can be controlled by the leader pin 30 because the outer surfaces 44B of the projecting portions 44 pressingly contact the inner surfaces 36B of the flange portions 36 of the leader pin 30. Further, because of this, the leader pin 30 is prevented from falling out of the holding portions 40 because the flange portions 36 of the leader pin 30 are held by the projecting portions 44.

Figure 11:
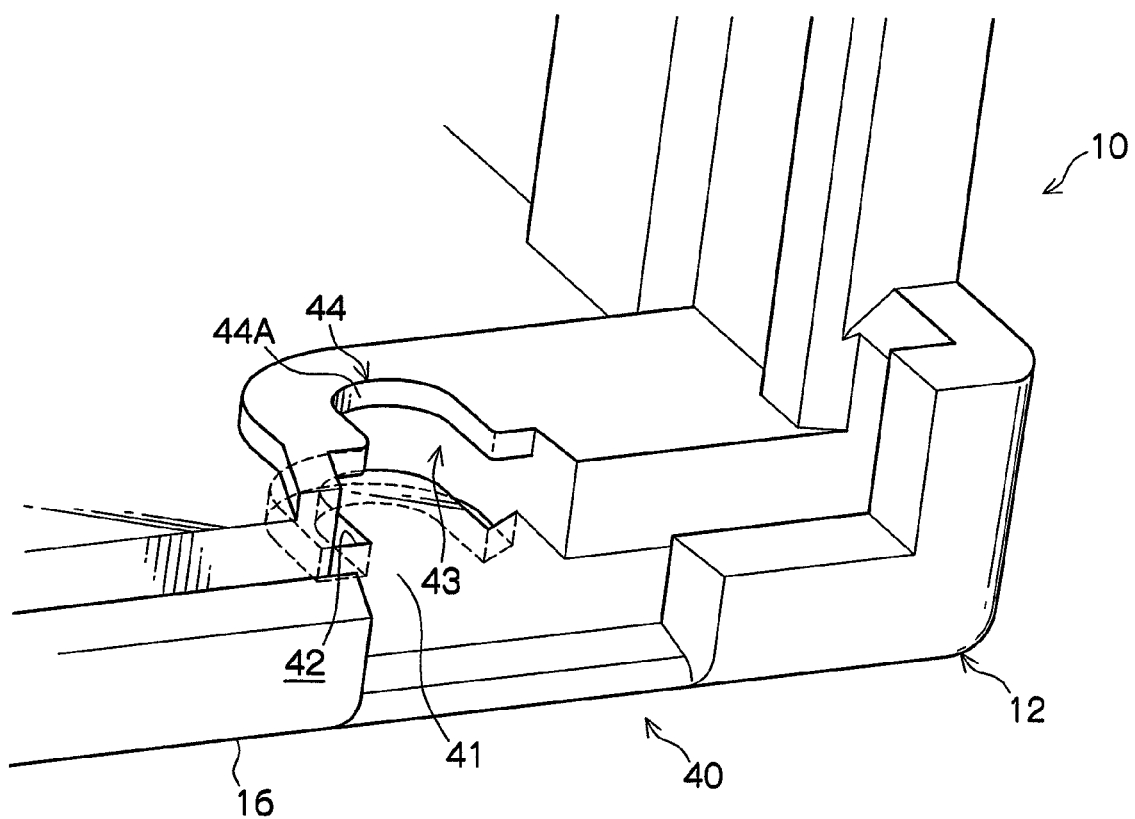
FIG. 11 is a general perspective view showing the holding portion when a spring that holds the leader pin is omitted.

Further, when the recording tape cartridge 10 is not in use when it is not loaded into the drive device, the projecting portions 44 admit the body portion 32 of the leader pin 30 by the cutout portions 44A that are substantially U-shaped when seen in plan view, and the projecting portions 44 always overlap the flange portions 36 by a predetermined amount at the inner surface 36B sides of the flange portions 36, so the leader pin 30 is prevented from slanting and coming out of the holding portions 40. Consequently, as shown in FIG. 11, the plate spring 38 that holds the leader pin 30 (the flange portions 36) can be omitted.

Further, the through holes 42 end up being formed in the case 12 (the upper case 14 and the lower case 16), but the projecting portions 44 that overlap, but do not contact, the flange portions 36 of the leader pin 30 are molded such that they do not become undercut portions. Consequently, it is not necessary to dispose a slide mechanism in the mold and the configuration of the mold does not become complicated. That is, the configuration of the mold can be simplified, and the drawback of the mold becoming expensive does not arise. Further, because of this, the shape of the vicinity of the holding portions 40 that is a complex shape can be stabilized, and occurrences of trouble can be prevented.

Further, the clearance K between the outer peripheral surfaces 36C of the flange portions 36 and the inner wall surfaces 43 formed around the through holes 42 in a state where the leader pin 30 is held in the holding portions 40 is set to be less than 0.5 mm. Consequently, the dust resistance of the recording tape cartridge 10 can be ensured with no change from what has conventionally been the case.

It will be noted that the dust resistance can be further raised when the through holes 42 are blocked by the blocking member 70, that is, the seal members 68, the seal member 72, or the clip member 74. Particularly in the case of the seal member 72 and the clip member 74 which are disposed so as to straddle the upper case 14 and the lower case 16, the splitting phenomenon that occurs because of shock being imparted to the case 12 as a result of the recording tape cartridge 10 being dropped or the like can be deterred.

Figure 12:
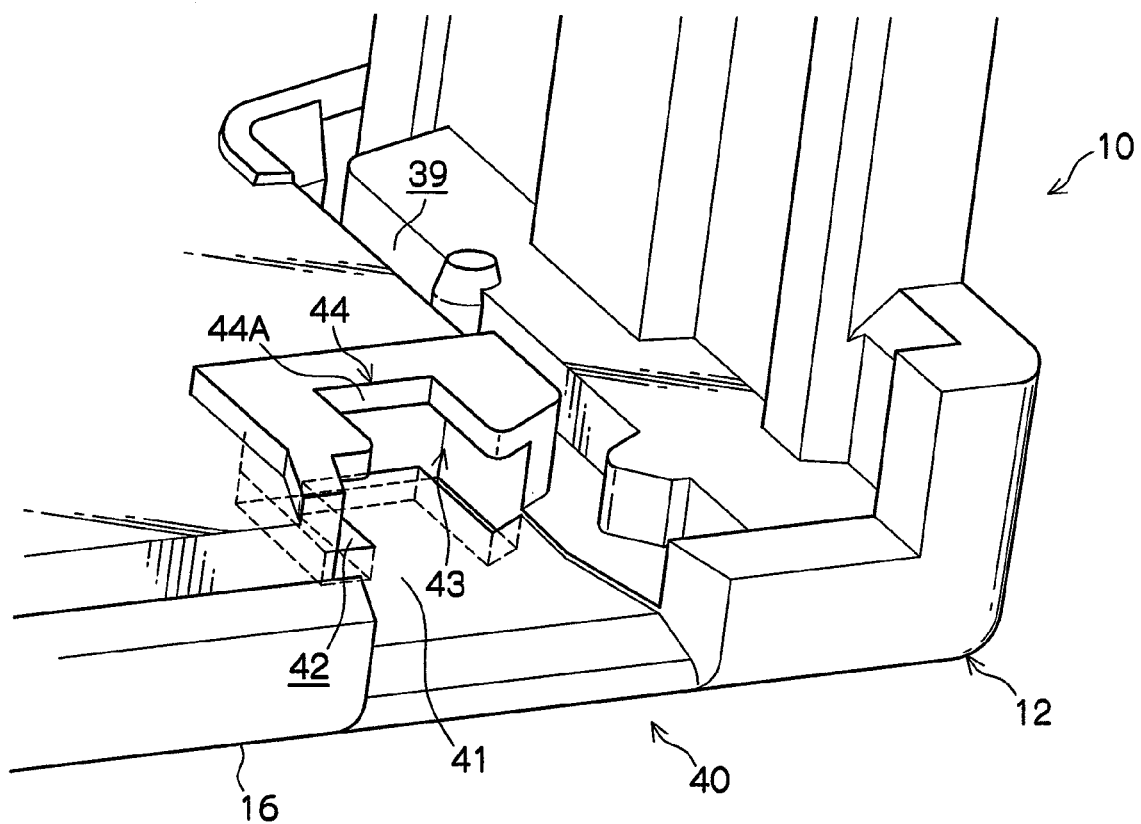
FIG. 12 is a general perspective view showing a first modification of the holding portion.
Figure 13:
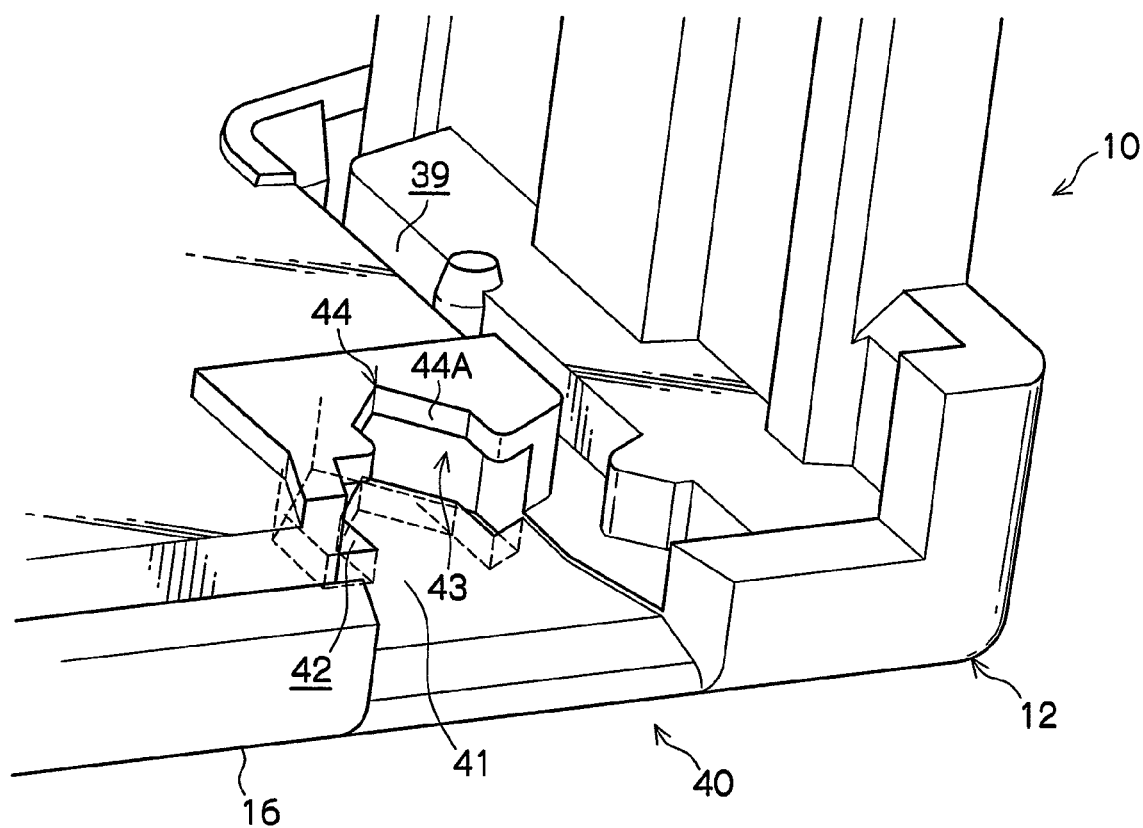
FIG. 13 is a general perspective view showing a second modification of the holding portion.

Further, the shape of the projecting portions 44 (the cutout portions 44A) is not limited to the shape shown in FIG. 1 to FIG. 11. As shown in FIG. 12, for example, the cutout portions 44A may also be formed in a rectangular shape, or as shown in FIG. 13, for example, the cutout portions 44A may also be formed in a home plate shape (a pentagonal shape). Further, as shown in FIG. 14, for example, the cutout portions 44A may also be given a shape that is a combination of a rectangular shape and a semicircular shape in order from the opening 18 side.

Figure 14:
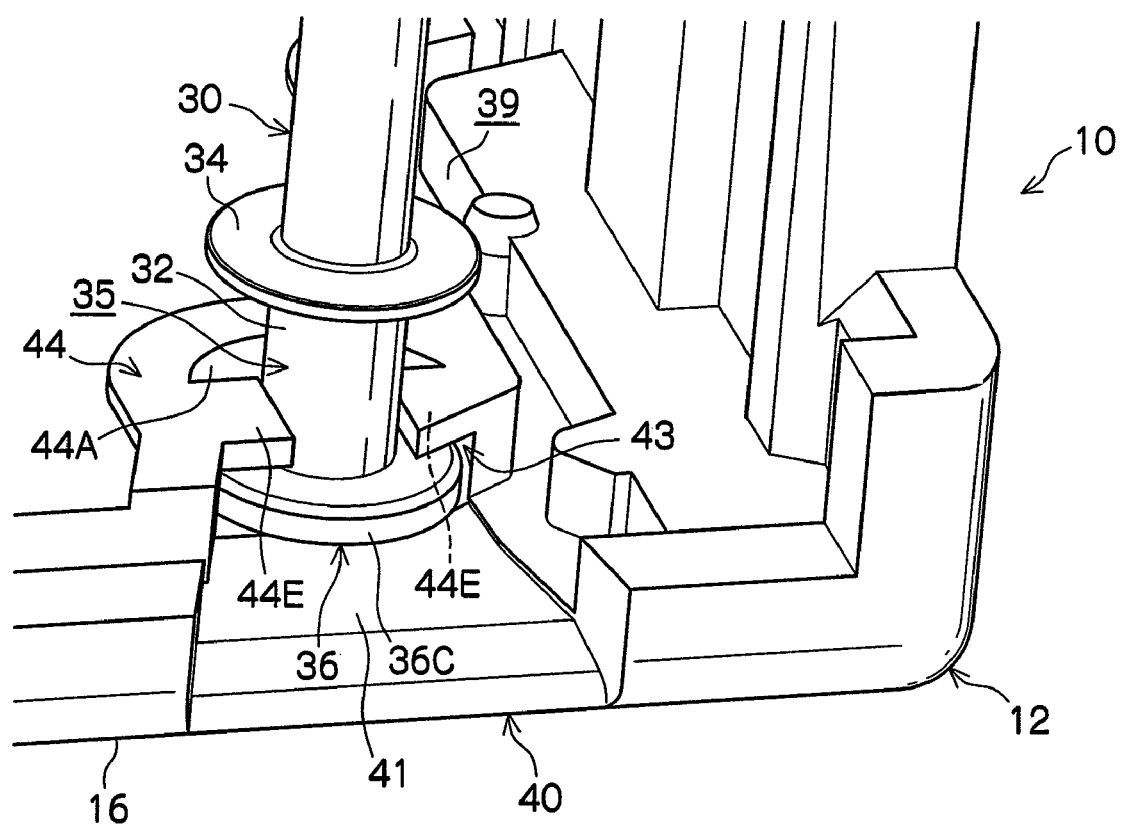
FIG. 14 is a general perspective view showing a third modification of the holding portion.

Specifically, projecting pieces 44E that mutually project towards the leader pin 30 (the body portion 32) are formed on both end portions of the projecting portions 44 shown in FIG. 14 on the side in the direction in which the recording tape T is pulled out, and a predetermined clearance is formed between the mutually opposing peripheral surfaces of the projecting pieces 44E and the peripheral surface of the body portion 32. Further, when the shape of the projecting portions 44 is variously changed in this manner, it goes without saying that the shape of the through holes 42 is also variously changed to the same shape.

In any event, it suffices for the projecting portions 44 (the cutout portions 44A) to be formed in a shape that can admit the body portion 32 and can overlap, but without contact, the flange portions 36 by a predetermined amount (e.g., 30% or more of the inner surfaces 36B) on the inner surface 36B side of the flange portions 36. Further, it is desirable for the projecting portions 44 to be disposed in both the upper case 14 and the lower case 16, but the projecting portion 44 may also be disposed just in either one of the upper case 14 and the lower case 16.

Figure 15:
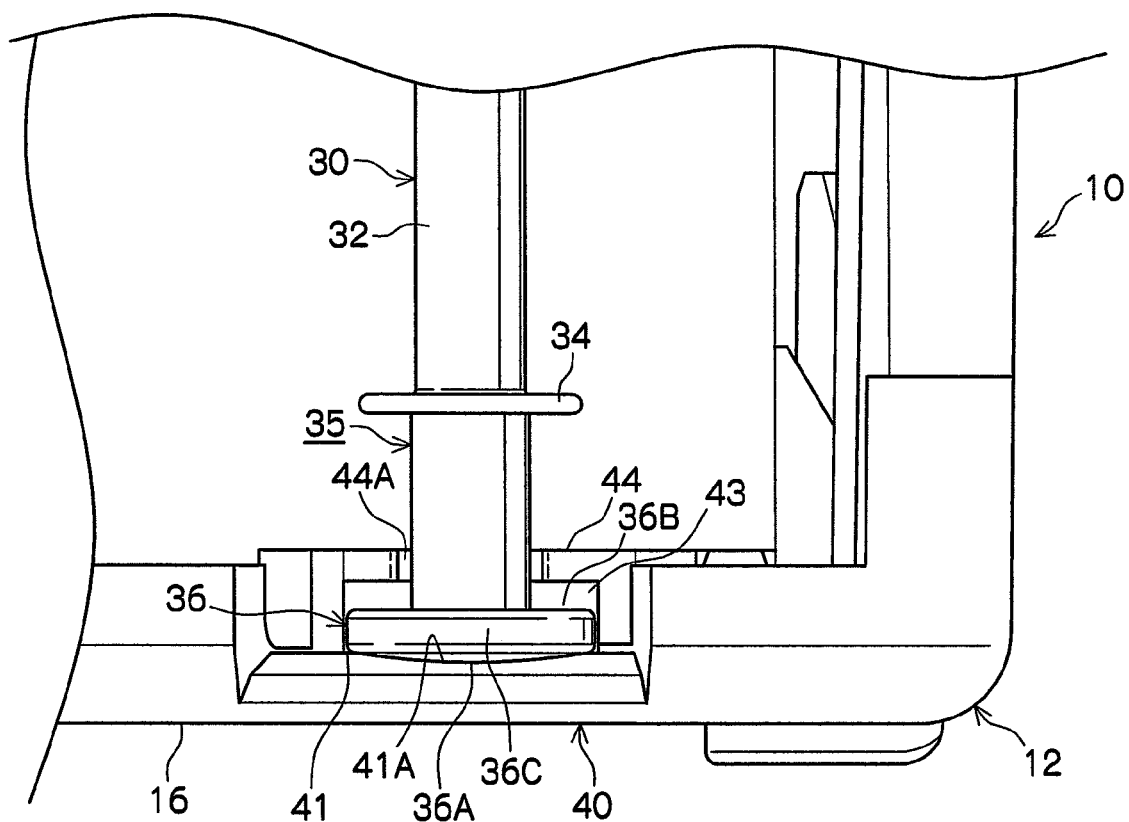
FIG. 15 is a general front view showing a fourth modification of the holding portion.

Further, the shape of the concave portions 41 is not limited to the shape shown in FIG. 1 to FIG. 14. For example, as shown in FIG. 15, concavely curved surfaces 41A having a small curvature (having the same curvature as that of the outer surfaces 36A of the flange portions 36) may be formed in the concave portions 41 and configured to hold the outer surfaces 36A formed as convexly curved surfaces of the flange portions 36. According to this, the concave portions 41 can hold the leader pin 30 so as to further prevent the leader pin 30 from falling out.

Further, in the recording tape cartridge 10 having this configuration, part of the flange portions 36 (the outer surfaces 36A) of the leader pin 30 are exposed from the through holes 42. Consequently, at the point in time when the recording tape cartridge 10 is loaded into the drive device (before the leader pin 30 is pulled out from the case 12), it becomes possible for the drive device to contact the leader pin 30 from the through holes 42. That is, because of this, at the point in time when the recording tape cartridge 10 is loaded into the drive device, it becomes possible for the electrical charge with which the recording tape T has been charged to escape to the drive device via the leader pin 30.

What is claimed is:

1. A recording tape cartridge comprising:
   a case that is configured by an upper case and a lower case and which singly houses a reel onto which recording tape is wound;
   a leader member that is attached to an end portion of the recording tape directly or via leader tape;
   flange portions formed on both ends of the leader member;
   an opening that is formed in the case and is for allowing the leader member to be pulled out;
   holding portions that are formed in the upper case and the lower case and hold the flange portions of the leader member in the vicinity of the opening;
   a projecting portion that is formed on at least one of the holding portions and which overlaps the flange portions on inner surface sides of the flange portions when the leader member is held in the holding portions; and
   a through hole that is formed in the holding portions of the upper case and of the lower case and from which part of the flange portions is exposed when the leader member is held in the holding portions;

whereby the projecting portions do not include undercut portions between the upper case and lower case.

2. The recording tape cartridge of claim 1, wherein a clearance between peripheral surfaces of the flange portions held in the holding portions and wall surfaces that are formed around the through holes and which the peripheral surfaces face is less than 0.5 mm.

3. The recording tape cartridge of claim 1, further comprising a blocking member that blocks the through hole.

4. The recording tape cartridge of claim 3, wherein the blocking member is formed continuously so as to straddle the upper case and the lower case, and the blocking member blocks the through hole.

5. The recording tape cartridge of claim 1, wherein the projecting portion includes a cutout that opens towards the opening formed in the case, and the projecting portion houses the leader member inside the cutout.

6. The recording tape cartridge of claim 5, wherein the cutout has a substantial U shape.

7. The recording tape cartridge of claim 5, wherein the cutout has a substantially rectangular shape.

8. The recording tape cartridge of claim 5, wherein the cutout has a substantially pentagonal shape.

9. The recording tape cartridge of claim 5, wherein the projection portion has a first diagonal cutout adjacent the cutout for admitting an end portion of a plate spring.

10. The recording tape cartridge of claim 9, wherein the through hole has a two end portions, and one of the end portions has a second diagonal cut-out that mirrors the first diagonal cutout of the projection portion.

11. The recording tape cartridge of claim 1, wherein the through hole has a substantial U shape when seen in plan view.

12. The recording tape cartridge of claim 1, wherein each of the holding portions has a concavely curved surface that holds an outer surface of the flange portions and a curvature of the concavely curved surface is equal to that of convexly curved surfaces of the flange portions.

13. The recording tape cartridge of claim 1 wherein the through hole has a shape substantially similar to a shape of the projection portion when viewed in plan view.

14. The recording tape cartridge of claim 1, wherein the projection portion has sides that face a direction in which the leader member is to be pulled out, and wherein the sides includes a chamfer for allowing the leader pin to returned to the holding portions in a state where the leader pin is slanted.

* * * * *